United States Patent
Keogh

(10) Patent No.: US 7,666,460 B1
(45) Date of Patent: Feb. 23, 2010

(54) PROCESS FOR PRODUCING AN EXPANDED FOODSTUFF

(75) Inventor: Andrew Joseph Keogh, Melbourne (AU)

(73) Assignee: Cadbury Holdings Limited (GB)

( * ) Notice: Subject to any disclaimer, the term of this patent is extended or adjusted under 35 U.S.C. 154(b) by 0 days.

(21) Appl. No.: 09/889,019

(22) PCT Filed: Jan. 17, 2000

(86) PCT No.: PCT/GB00/00102

§ 371 (c)(1),
(2), (4) Date: Nov. 30, 2001

(87) PCT Pub. No.: WO00/41580

PCT Pub. Date: Jul. 20, 2000

(30) Foreign Application Priority Data

Jan. 15, 1999 (GB) .................................. 9900772.6

(51) Int. Cl.
*A23G 9/14* (2006.01)
(52) U.S. Cl. ........................ 426/660; 426/445; 426/447; 426/448
(58) Field of Classification Search ................. 426/660, 426/445, 447, 448
See application file for complete search history.

(56) References Cited

U.S. PATENT DOCUMENTS

| | | | | |
|---|---|---|---|---|
| 3,989,853 A | * | 11/1976 | Forkner | ....................... 426/305 |
| 4,259,359 A | * | 3/1981 | Spicer | .......................... 426/62 |
| 4,331,690 A | | 5/1982 | Bradshaw | |
| 4,623,546 A | * | 11/1986 | Holay et al. | ................. 426/448 |
| 4,744,993 A | * | 5/1988 | Bisson et al. | .................. 426/38 |
| 4,839,193 A | | 6/1989 | Mange et al. | |
| 4,869,911 A | * | 9/1989 | Keller | .......................... 426/94 |
| 5,132,133 A | * | 7/1992 | Huber et al. | ................. 426/241 |

FOREIGN PATENT DOCUMENTS

WO  WO 97/34503  9/1997

* cited by examiner

*Primary Examiner*—Lien Tran
(74) *Attorney, Agent, or Firm*—Michael Best & Friedrich LLP

(57) ABSTRACT

A process for producing a set expanded foodstuff comprises the step of passing a soft expanded foodstuff composition at a first temperature and a first pressure into a setting region at a second temperature, the second temperature being lower than said first temperature. The soft expanded foodstuff composition is cooled and set in the setting region at a second pressure which is lower than said first pressure. A process for producing a set expanded foodstuff, comprises the steps of passing a soft foodstuff composition which may be in at least a partially expanded condition and which contains a vaporisable expandingagent, at a first temperature and a first pressure into a setting region at a second temperature, said second temperature being lower than said first temperature. The soft foodstuff composition is cooled and set in the setting region at a second pressure which is lower than said first pressure so as to expand or further expand the foodstuff composition by evaporation of the vaporisable expanding agent.

12 Claims, No Drawings

PROCESS FOR PRODUCING AN EXPANDED FOODSTUFF

The present invention relates to a process for producing an expanded foodstuff, and more particularly to a process for producing a set expanded foodstuff.

Expanded foodstuffs (i.e. foodstuffs incorporating air and/or other gas; carbon dioxide or nitrogen, for example) are well known. They may be formed by adding gas directly into the foodstuff composition, for example by mechanical beating and optionally subjecting the foodstuff to a reduced pressure or by injecting gas under pressure and subsequently releasing the pressure (e.g. extrusion). Alternatively (or in combination with the above), a chemical agent (e.g. sodium bicarbonate) may be incorporated into the foodstuff composition, which agent results in the formation of gas in the foodstuff composition.

A particular difficulty in the formation of expanded foodstuffs is obtaining a consistent product with the required degree of expansion necessary for a desired texture and, where the foodstuff is intended for human consumption, mouthfeel. Over-expansion may result in the foodstuff having a hollow interior. Conversely, care must be taken not to allow the expanded foodstuff to collapse before it has set properly. This is a particular problem if expansion is effected at an elevated temperature, in which case the foodstuff must be solidified under carefully controlled conditions. For example, if expansion is effected under vacuum at an elevated temperature, the vacuum must generally be maintained until the moisture content of the foodstuff has reduced sufficiently for it to set. In another method, the expanded foodstuff is stabilised by reducing its moisture content by conditioning at elevated temperature (approximately 100° C.) for one hour or more before being allowed to cool. Such processes may be time consuming and costly.

It is an object of the present invention to provide an improved process for setting expanded foodstuffs which obviates or mitigates the above-mentioned problems.

According to a first aspect of the present invention, there is provided a process for producing a expanded foodstuff, comprising the steps of passing a soft expanded foodstuff composition at a first temperature and a first pressure into a setting region at a second temperature, said second temperature being lower than said first temperature; and cooling and setting said soft expanded foodstuff composition in the setting region at a second pressure which is lower than said first pressure.

According to a second aspect of the present invention, there is provided a process for producing a set expanded foodstuff, comprising the steps of passing a soft foodstuff composition which may be in at least a partially expanded condition and which contains a vaporisable expanding agent, at a first temperature and a first pressure into a setting region at a second temperature, said second temperature being lower than said first temperature; and cooling and setting said soft foodstuff composition in the setting region at a second pressure which is lower than said first pressure so as to expand or further expand the foodstuff composition by evaporation of the vaporisable expanding agent.

As used herein, "soft" in relation to the foodstuff composition relates to such foodstuff composition which may have been expanded but which is in a plastic state and is therefore capable of expansion (or further expansion) or contraction.

Preferably, the first temperature is typically in the range 70 to 150° C. The first pressure is preferably substantially atmospheric pressure.

The second temperature is preferably in the range of 10 to 50° C. but is typically ambient temperature. The second pressure is preferably in the range of $2 \times 10^4$ to $7 \times 10^4$ Pa, more preferably $3.3 \times 10^4$ to $5 \times 10^4$ Pa.

Preferably, the setting region is substantially maintained at the second temperature and the second pressure, thereby allowing the process to be continuous. More preferably, the setting region is provided with an inlet and an outlet, and is arranged such that the soft foodstuff composition enters the setting region via the inlet, and set foodstuff composition emerges from the outlet.

In one embodiment, the foodstuff composition is carried through the setting region by a belt conveyor. The residence time of the foodstuff composition in the setting region may be controlled by adjusting the speed of the conveyor. The time required to set the soft foodstuff composition can be ten minutes or less and can be as short as about three minutes.

Initial expansion (i.e. expansion prior to passing into the setting region) may be at least partially effected by application of heat and/or by reduction of pressure (e.g. application of partial vacuum or extrusion through a die from a relatively high pressure region into a relatively low pressure region).

In general, expansion of a foodstuff composition requires an expanding agent to be incorporated into the composition. Suitable expanding agents include chemical expanding agents such as sodium or ammonium bicarbonate and gaseous or vaporisable expanding agent, such as gaseous or supercritical carbon dioxide or nitrogen, compressed air or water.

In the process according to the first aspect of the invention, one or more chemical and/or gaseous or vaporisable expanding agents may be included as an ingredient of the foodstuff composition.

In the process according to the second aspect of the invention, one or more chemical and/or gaseous expanding agents may be included as an ingredient of the foodstuff composition in addition to the vaporisable expanding agent which is preferably selected from supercritical carbon dioxide or nitrogen, or water.

It will be understood that evaporation of the vaporisable expanding agent, when present, will assist in cooling and setting of the foodstuff composition.

The foodstuff composition may contain any ingredient or combination of ingredients (in addition to any expanding agent) which when mixed together under the described conditions will form a mass capable of expansion in its plastic state and a solidification or setting which retains the physical characteristics of that expanded state. Preferably the foodstuff composition is a confectionery composition and will generally contain (in addition to any expanding agent) one or more ingredients selected from cocoa solids, sugar, other carbohydrate (e.g. mono-, di-, oligo- and poly-saccharides) malted milk, malt extract, skim milk powder, whole milk powder, maltodextrin, vegetable oil or fat, starch, binding agents such as gluten, casein, pectin, gum and gelatin, flavouring agents and colouring agents.

The foodstuff composition may be subjected to a forming procedure, in which the foodstuff composition is formed into pieces of a desired shape, for example bars or "balls" (i.e. pieces of a near spherical shape). Such forming procedure may involve deposition of the foodstuff composition into moulds prior to expansion. Alternatively, the forming procedure may be effected on the expanded but soft foodstuff composition (for example cutting an expanded composition into pieces following extrusion and optionally tumbling the pieces to form balls).

In a preferred embodiment of said first aspect, the soft expanded foodstuff composition is formed by extrusion, preferably using an extrusion cooker.

In a highly preferred embodiment of said first aspect, the extruded soft expanded foodstuff composition is cut into pieces and is formed into balls by tumbling, during which process the expanded foodstuff composition is heated to the first temperature prior to being passed into the setting region.

Subsequent to setting, the set expanded foodstuff pieces may be sent for packaging or be subjected to a further procedure, for example enrobing with, for example, a chocolate coating composition.

The present invention will now be described in more detail in the following Examples.

EXAMPLE 1

| Recipe (kg by weight) | |
| --- | --- |
| Sugar | 57.9 |
| Dried corn syrup | 36.1 |

A batch was weighed according to the above recipe and mixed in a ribbon blender. The resultant composition was added to section 1 of the feed zone of an 11-section Wenger TX52 twin co-rotating screw extrusion cooker at the rate of 21 kg/hr. Section 6 of the extruder was furnished with a vent which, in this example, was open to the atmosphere. The extruder shaft speed was 210 rpm and extruder motor load was 48%. The extruder temperature in sections 1 to 3 was maintained between 30 and 40° C., sections 4 to 6 between 140 and 150° C. and sections 6 to 11 between 60 and 65° C. A freshly prepared slurry of sodium bicarbonate (6 kg) in 42DE corn syrup (4 kg) was pumped into the open extruder vent at a rate of 2.3 kg/hr. The mass at 1030 kPa from section 11 was extruded through a circular die to form a continuous rope.

The rope emerging from the die (into a region at atmospheric pressure) was passed under a starch feeder to be coated with starch before being cut by a spring-loaded knife producing small cylindrical pieces. These were transferred to a vibrating conveyor to form approximately spherical pieces with a temperature of about 120° C. and a uniform expanded structure. The pieces were equilibrated to 70° C. so as to be in the "soft" state and then passed from the vibrating conveyor to a vacuum oven (temperature 20° C. and pressure $6\times10^4$ Pa) so as to cool and set the pieces. On removal from the oven after only 3 minutes retention time, the pieces were crisp and had retained their uniform expanded structure.

EXAMPLE 2

| Recipe (kg by weight) | |
| --- | --- |
| Granulated sugar | 37.9 |
| Dried glucose syrup solids 42DE | 25.2 |
| Skim milk powder | 29.0 |
| Low fat (11%) cocoa powder | 7.9 |

A batch was weighed according to the above recipe and mixed in a ribbon blender. The resultant composition was added to section 1 of the feed zone of an 11-section Wenger TX52 twin co-rotating screw extrusion cooker at the rate of 50 kg/hr. Section 6 of the extruder was furnished with a vent which, in this example, was open to the atmosphere. The extruder shaft speed was 150 rpm and extruder motor load was 89%. The extruder temperature in sections 1 to 3 was maintained between 30 and 40° C., sections 4 to 6 at 55° C. and sections 6 to 11 at 60° C. A freshly prepared slurry of sodium bicarbonate (6 kg) in 42DE corn syrup (4 kg) was pumped into the open extruder vent at a rate of 2.5 kg/hr. The mass at 2760 kPa from section 11 was extruded through a circular die to form a continuous rope.

The rope emerging from the die (into a region at atmospheric pressure) was passed under a starch feeder to be coated with starch before being cut by a spring-loaded knife producing small cylindrical pieces. These were transferred to a vibrating conveyor to form approximately spherical pieces with a temperature of about 105° C. and a uniform expanded structure. The pieces were equilibrated to 90° C. so as to be in the "soft" state and then passed from the vibrating conveyor to a vacuum oven (temperature 20° C. and pressure $5\times10^4$ Pa) so as to cool and set the pieces. On removal from the oven after only 3 minutes retention time, the pieces were crisp and had retained their uniform expanded structure.

EXAMPLE 3

| Recipe (kg by weight) | |
| --- | --- |
| Sugar | 46 |
| Dried glucose syrup | 46 |
| Milk powder | 0 5 |
| Water | 0 3 |

A batch was weighed according to the above recipe and mixed in a z-blade mixer to produce a heavy dough. The mixing process caused the temperature of the dough to rise to 75-80° C. This dough was rolled onto cool tables and cut into strips which were fed through chilled forming rolls to produce shapes connected by a thin web. The formed web was cooled until it became brittle and the formed shapes were then separated into discrete pieces by tumbling. The pieces so formed were equilibrated in a rotary hot-air applicator at a temperature of between 70 and 80° C. and subsequently transferred to a continuous vacuum chamber maintained at a temperature of between 20 and 40° C. and at a pressure of $5\times10^4$ Pa.

Under these conditions moisture in the pieces evaporated causing the pieces to expand. The evaporative cooling effect caused the pieces to cool below their glass transition temperature (about 70° C.), and they were removed after approximately 3 minutes. The pieces, now having a moisture content of less than 1% were crisp and retained their uniform expanded structure.

COMPARATIVE EXAMPLE 1

Example 1 was repeated, but after forming into balls, the pieces were cooled to 20° C. at atmospheric pressure. The resultant pieces were more dense than those of Example 1 due to some loss of expansion, and the uniform expanded structure was lost. The pieces had a shriveled appearance.

COMPARATIVE EXAMPLE 2

Example 1 was repeated, but after forming into balls, the pieces were dried in a multi-pass drier at 101° C. at atmospheric pressure and then allowed to cool to ambient temperature. A drying time of at least 35 minutes was required before the uniform expanded structure was maintained after cooling.

The invention claimed is:

1. A process for setting an expanded foodstuff, comprising the steps of passing an expanded foodstuff composition, which is in a plastic state and is therefore capable of further expansion or contraction, at a first temperature and a first pressure into a setting region at a second temperature, said second temperature being lower than said first temperature; and cooling and setting said expanded foodstuff composition which is to be set in the setting region at a second pressure which is lower than said first pressure, whereby to produce a set expanded foodstuff, wherein the expanded foodstuff composition to be set is formed by extrusion and the expanded foodstuff composition to be set is cut into pieces after extrusion and is formed into balls by tumbling during which procedure the expanded foodstuff composition is heated to the first temperature prior to being passed into the setting region.

2. A process as claimed in claim 1, wherein the first temperature is in the range of 70 to 150° C.

3. A process as claimed in claim 1, wherein the first pressure is substantially atmospheric pressure.

4. A process as claimed in claim 1, wherein the second temperature is in the range of 10 to 50° C.

5. A process as claimed in claim 1, wherein the second pressure is in the range of $2 \times 10^4$ to $7 \times 10^4$ Pa.

6. A process as claimed in claim 1, wherein the setting region is substantially maintained at the second temperature and the second pressure.

7. A process as claimed in claim 1, wherein the foodstuff composition is carried through the setting region by a belt conveyor.

8. A process as claimed in claim 1, wherein a chemical expanding agent is included as an ingredient of the composition.

9. A process as claimed in claim 1, wherein expansion is at least partially effected by application of heat and/or by reduction of pressure.

10. A process as claimed in claim 1, wherein the foodstuff composition is a confectionery composition.

11. A process as claimed in claim 1, wherein the foodstuff composition is subjected to a forming procedure, in which the foodstuff composition is formed into pieces of a desired shape.

12. A process as claimed in claim 1, wherein the foodstuff is initially expanded by at least one of heat and pressure.

* * * * *